July 23, 1940.　　　　E. BANDOLY　　　　2,209,182
THERMOMETER
Filed Oct. 28, 1938
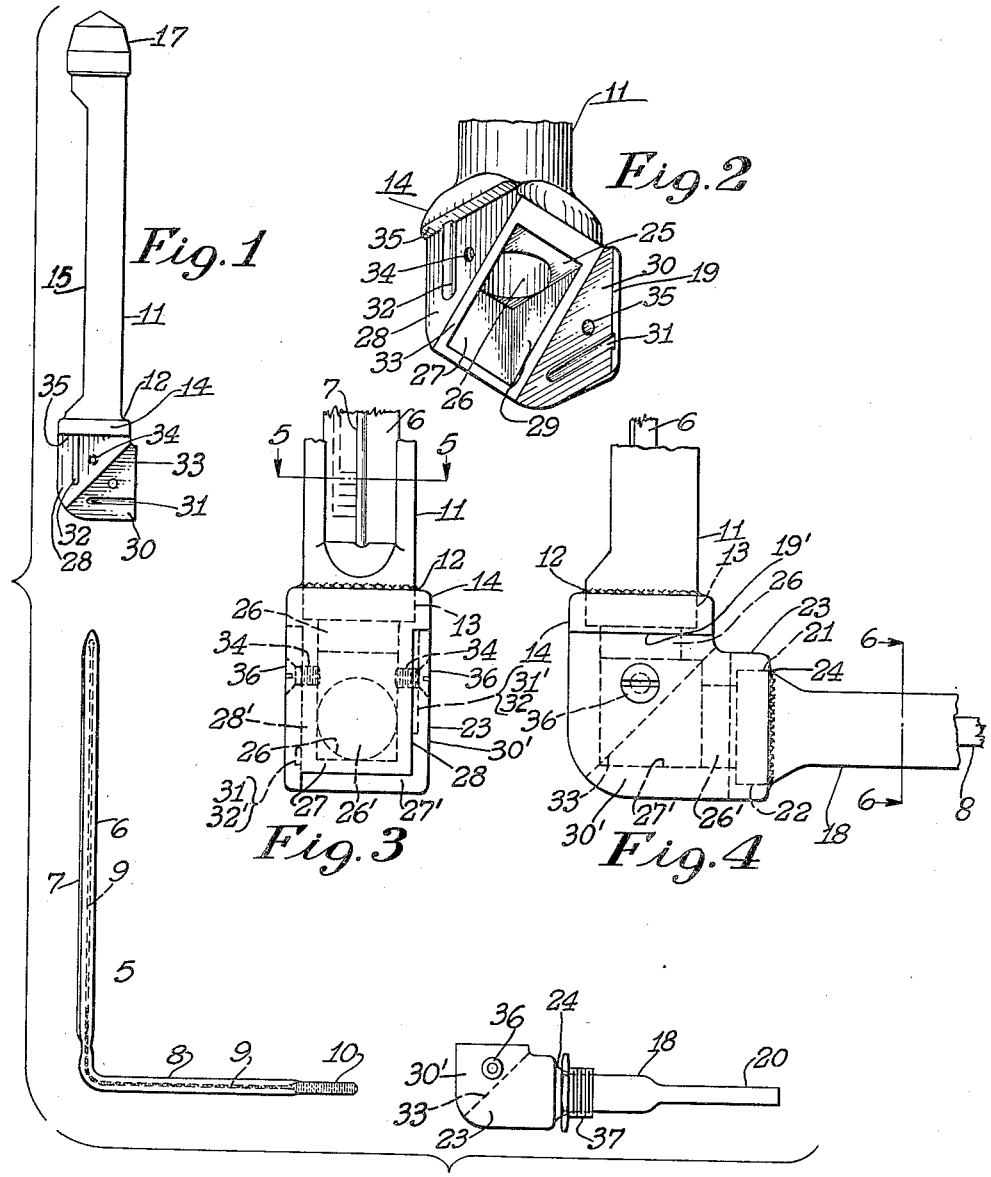
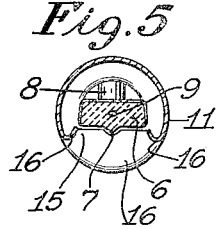
INVENTOR.
ERICH BANDOLY
BY D. Clyde Jones
ATTORNEY.

Patented July 23, 1940

2,209,182

UNITED STATES PATENT OFFICE 2,209,182

THERMOMETER

Erich Bandoly, Rochester, N. Y., assignor to Taylor Instrument Companies, Rochester, N. Y., a corporation of New York Application October 28, 1938, Serial No. 237,539

4 Claims. (Cl. 73—375)

This invention relates to thermometers and particularly to industrial thermometers.

In the copending application of K. L. Tate, Serial No. 236,469, filed October 22, 1938, there is disclosed a straight industrial thermometer in which the thermometer tube comprises a ribbon-like glass indicating portion fused to a section of marine glass tubing having a bulb portion on the free end thereof. By thus having the indicating portion of the thermometer of substantially rectangular cross-section, it is feasible for the first time to engrave the graduations or scale directly on the tube of industrial thermometers thereby obviating the need of separate scales and avoiding the possibility of accidental displacement of the thermometer tube or the scales. Another inherent advantage of this ribbon-like indicating portion in an industrial thermometer tube, is that a separate glass plate for closing the window opening in the thermometer casing is unnecessary since the reading surface of the thermometer tube may be disposed in contact with the margins of the casing window for closing the same.

In prior industrial thermometers of the angle type, the case has been removably threaded into a case angle fitting with its connected bulb chamber, in order to permit the case to be removed when the thermometer tube is to be inserted in the case and bulb chamber. When the thermometer tube has thus been inserted in the case it is screwed into the case angle fitting. This is possible since the indicating portion of the tube is of such cross section that the case can freely turn about the tube as an axis. However, when an angle thermometer tube having a ribbon-like indicating section is to be enclosed in an improved casing of the character disclosed in the mentioned application, the case cannot be rotated about the tube in the manner described, without breaking the tube.

It is the object of the present invention to provide an industrial thermometer of the angle type consisting of a minimum number of parts, which are readily assembled and in which a broken thermometer tube may be easily replaced. While the case of the present instrument is intended primarily for use with a glass thermometer tube having a flat, ribbon-like indicating portion, it may be used advantageously with conventional thermometer tubes since the complete thermometer can be assembled without rotating any of the parts, thereby avoiding the danger of breaking the tube by twisting as might occur if the tube binds on any part of the case during assembly.

It is a further object of the invention to provide an industrial thermometer case having a novel, separable case angle fitting whereby the assembly of the case proper and the bulb receiving chamber is easily effected and yet the parts are securely held together.

It is another object of this invention to provide a separable case angle fitting consisting of two readily assembled identical castings, stampings or the like.

These and other objects of the invention will appear from the detailed description and claims when taken with the drawing in which Fig. 1 represents an exploded view of the main elements of the present invention and shows respectively the case for the indicating portion of the thermometer tube, the angular thermometer tube and the bulb receiving chamber; Fig. 2 is a perspective view looking from below and from the rear, of a fragment of the case shown in Fig. 1 and particularly illustrating the structure of one of the parts of the case angle fitting, it being understood that a complementary part fixed to the bulb receiving chamber is of identical construction; Fig. 3 is a front view of a fragment of the assembled thermometer; Fig. 4 is a side view thereof, looking from the right of Fig. 3; and Figs. 5 and 6 are sections taken along lines 5—5 and 6—6 respectively, of Figs. 3 and 4.

Referring to the drawing and particularly to Figs. 1, 5 and 6, the thermometer tube generally designated 5 comprises a flat, ribbon-like glass section 6, substantially rectangular in cross-section, which may or may not be provided with a lens 7, and a connecting section of marine glass tubing 8, of reduced size, fused or integrally joined to the section 6. The sections 6 and 8 are provided with a continuous bore 9 which communicates with the bulb 10 fused on the free end of the tube section 8. The flat, ribbon-like section 6 lends itself to having the graduations and related numerals engraved either on the broad front or rear surfaces thereof. However, it has been found desirable to place the graduations and numerals on the rear surface of the section, thus preventing steam, fumes or the like from attacking the paint usually applied to the engraved graduations and numerals. A suitable light shield of paint, glass, enamel or the like may be applied to the rear and side surfaces of the indicating section 6 to aid in reading the thermometer.

The indicating section 6 of the thermometer tube is supported within a tubular metal case 11, open at its upper end and having its lower end secured, as by welding 12 in a recess 13 in one part 14 of a separable case angle fitting to be described in greater detail hereinafter. The thermometer tube is adapted to be viewed through a window opening 15 formed in the case 11. The margins of the window opening are preferably bent inwardly to provide flanges 16 which may or may not engage the front surface of the thermometer tube section 6, thereby substantially closing the window opening, and obviating the need of a separate glass plate closure for the opening. The upper end of the tube section 6 may be held in position within the case 11 by any suitable means, but it is preferred to use a plurality of spring fingers (not shown) anchored in the upper portion of the case, in the manner shown in the mentioned copending application.

The upper end of the case 11 may be closed by means of a removable cap 17 having diametrically opposed inwardly projecting pins (not shown) adapted to seat in bayonet slots (not shown) provided in the upper end of the case.

The tube section 8 and the bulb 10 are enclosed in a bulb chamber 18. This chamber comprises a tubular metal section having one end portion 20 of reduced diameter, while the other end portion 21 is of substantially the same diameter as the case 11. The end portion 21 is seated in a recess 22 in the other part 23 of the separable, case angle fitting where it may be welded or otherwise secured as indicated at 24.

The parts 14 and 23 are identical in construction and therefore a detailed description of one of these parts will be sufficient, the corresponding elements of these two parts being designated by the same reference characters, except that in the case of part 23 the characters are primed. The part 14 which is preferably a casting, is best illustrated in the perspective view of Fig. 2. This part is in the form of a hollow rectangular prism open at its inclined face but otherwise defined by rectangular walls 25 and 27 which are joined together at two of their edges at right angles to each other, and by the triangular side walls 28 and 29, respectively joined to the intersecting edges of the walls 25 and 27. Thus when the parts 14 and 23 are assembled with their open faces together, a hollow cube results in which the bend in the thermometer tube is enclosed. The rectangular wall 25 is cast or formed with the previously mentioned recess 13 therein for the reception of the tubular case 11 which is soldered or welded therein and an aperture 26 centrally positioned in the recess affords communication between the case 11 and the interior of the part 14. The triangular wall 29 has integrally formed on its outer face a rectangular plate 30 terminating in an abrupt edge 19, while the wall 25 adjacent its junction with the triangular wall 28 is provided with a projecting shoulder 35 against which the abrupt edge 19' of the part 23 is adapted to engage and thereby hold the parts 14 and 23 in fixed angular relation when they are assembled. The plate 30 is provided with a recess 31 and the triangular wall 28 is provided with a raised rib 32 so that the rib 32' on the part 23 can engage the groove 31 on the part 14, whereas the rib 32 on the part 14 can engage the groove 31' on the plate of the part 23. This interengagement affords further rigidity to the assembled fitting. It will be understood that the recesses 31, 31' and the rib 32, 32' are of such limited depth that they can be easily interengaged during the course of the assembling of the instrument.

In assembling the thermometer, the indicating section 6 of the thermometer tube may first be inserted in the case 11 through the part 14 and then the part 23 with its attached bulb chamber 18 may be slipped over the tube section 8 as well as the bulb 10. It will be noted that the wall 30' of the casting 23 will overlie the outer surface of the wall 28 of the casting 14, and similarly the wall 30 of the casting 14 will overlie the outer surface of the wall 28' of the casting 23, while the inclined edges 33 of the castings mate to form a closed angular joint. The grooves 31 and 31' on the walls 30 and 30' of each casting receives the ribs 32 and 32' on the walls 28 and 28', to hold the parts in assembled position. Each of the walls 28 and 28' of the two castings 14 and 23 are provided with threaded holes 34 alined with the countersunk holes 35 on the walls 30 and 30' to receive the screws 36 which hold the fitting in assembled position.

The bulb chamber 18 may be provided with an externally threaded nut 37 rotatably mounted thereon, for engaging complementary threads on a part to which the thermometer is fastened.

I claim:

1. In an angle type thermometer, an angular thermometer tube, a case and a bulb chamber serving to enclose said tube, identical hollow parts respectively connected to said case and to said bulb chamber, each part being in the form of a right angle prism open at an inclined side, a wing on one part, a shoulder on the other part, said wing engaging the shoulder on the first mentioned part to hold said parts in fixed angular relation, and means for fastening said parts together.

2. In an angle type thermometer, an angular thermometer tube, a case and a bulb chamber serving to enclose said tube, two hollow parts respectively connected to said case and to said bulb chamber for housing the bend in said tube, each part being in the form of a right angle prism open at one inclined side, a wing on one side of each part, said wing extending in the same general direction as said side for overlapping relation with a side of the other part, and means including said wings for attaching said parts to each other with said open faces together.

3. In an angle type thermometer, an angular thermometer tube, a case and a bulb chamber serving to enclose said tube, hollow parts respectively connected to said case and to said bulb chamber for housing the bend in said tube, a wing-like portion of each part adapted to overlap a side of the other part, and means including said portions for separably attaching said parts together.

4. In an angle type thermometer, an angular thermometer tube, a casing and a bulb chamber serving to enclose said tube, a fitting having two substantially identical separable parts respectively attached to said case and said bulb chamber for housing the bend in said tube, each part having an extension at one side thereof, the opposite side of each part having a surface complementary to the inner surface of said extension, the extension of each part being superimposed on said surface on said opposite side of the other part, and means for securing said extensions to said last-mentioned surfaces.

ERICH BANDOLY.